(12) United States Patent
Krishnamurthy et al.

(10) Patent No.: US 10,437,566 B2
(45) Date of Patent: *Oct. 8, 2019

(54) GENERATING RUNTIME COMPONENTS

(71) Applicant: Oracle International Corporation, Redwood Shores, CA (US)

(72) Inventors: Sudharsan Krishnamurthy, Fremont, CA (US); Chidananda Kakunje, Northville, MI (US); Nitin Hase, Hyderabad (IN); Anil Gunnam, East Godavari District (IN); Narni Rajesh, Hyderabad (IN); Prasanna Sethuraman, Chennai (IN); Ashwin Shah, Hyderabad (IN); John Punin, Mountain View, CA (US); Sunitha Mukka, Richardson, TX (US); Aditya Ramamurthy, Hyderabad (IN); Jyothi Naga Paruchuri, Vijayawada (IN)

(73) Assignee: Oracle International Corporation, Redwood Shores, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 15/423,294

(22) Filed: Feb. 2, 2017

(65) Prior Publication Data
US 2017/0147297 A1 May 25, 2017

Related U.S. Application Data

(63) Continuation of application No. 14/717,155, filed on May 20, 2015, now Pat. No. 9,582,254.
(Continued)

(51) Int. Cl.
*G06F 8/34* (2018.01)
*G06F 8/71* (2018.01)
(Continued)

(52) U.S. Cl.
CPC ............... *G06F 8/34* (2013.01); *G06F 8/20* (2013.01); *G06F 8/71* (2013.01); *G06Q 10/06* (2013.01)

(58) Field of Classification Search
CPC ............... G06F 8/20; G06F 8/34; G06F 8/71
See application file for complete search history.

(56) References Cited

U.S. PATENT DOCUMENTS 6,230,309 B1    5/2001   Turner et al.
7,188,158 B1 *   3/2007   Stanton ..................... G06F 8/20
                                                        709/220

(Continued)

OTHER PUBLICATIONS

Alamri et al., Classification of the state-of-the-art dynamic web services composition techniques, http://citeseerx.ist.psu.edu/viewdoc/downloaddoi=1 0.1.1.84.4923&rep=rep1 &type=pdf>, 2006, pp. 148-166.

(Continued)

*Primary Examiner* — Ziaul A Chowdhury
(74) *Attorney, Agent, or Firm* — Kilpatrick Townsend & Stockton, LLP

(57) ABSTRACT

Embodiments of the invention provide systems and methods for generating runtime components in various hardware and software computer systems. More specifically, certain embodiments of the present invention describe a design-time interface by which applications may be designed, generated, and deployed in accordance within the underlying source systems of a computer system. Components may be selected, customized, and linked together to form a functional end-to-end application based on a multitude of underlying technologies within a system. Upon completion of the application design, application metadata and/or runtime components may be generated and deployed within the computer system. During execution, such the runtime components deployed within the system may collaborate to (Continued)

receive and process event streams from various event sources, analyze incoming data, and generate logical transaction objects, alerts, and other responses using various source systems.

12 Claims, 13 Drawing Sheets

Related U.S. Application Data

(60) Provisional application No. 62/001,816, filed on May 22, 2014.

(51) Int. Cl.
*G06F 8/20* (2018.01)
*G06Q 10/06* (2012.01)

(56) References Cited

U.S. PATENT DOCUMENTS

| | | | | |
|---|---|---|---|---|
| 7,716,631 | B1* | 5/2010 | Katzer | G06F 8/20 717/102 |
| 7,849,440 | B1 | 12/2010 | Englehart | |
| 7,886,234 | B2 | 2/2011 | Shih et al. | |
| 8,843,884 | B1 | 9/2014 | Koerner | |
| 9,582,254 | B2 | 2/2017 | Krishnamurthy et al. | |
| 2003/0009250 | A1* | 1/2003 | Resnick | G06F 8/20 700/94 |
| 2003/0120593 | A1 | 6/2003 | Bansal et al. | |
| 2003/0121024 | A1* | 6/2003 | Hill | G06F 8/71 717/107 |
| 2004/0143822 | A1* | 7/2004 | Jager | G06F 8/34 717/140 |
| 2004/0177355 | A1 | 9/2004 | Wragge | |
| 2004/0187140 | A1* | 9/2004 | Aigner | G06F 8/20 719/328 |
| 2004/0250258 | A1* | 12/2004 | Raghuvir | G06F 8/71 719/315 |
| 2006/0064178 | A1* | 3/2006 | Butterfield | G06F 8/20 700/18 |
| 2006/0074736 | A1 | 4/2006 | Shukla et al. | |
| 2006/0236302 | A1* | 10/2006 | Bateman | G06F 8/34 717/104 |
| 2006/0277194 | A1* | 12/2006 | Britt | H04L 67/10 |
| 2007/0044069 | A1 | 2/2007 | Doucette et al. | |
| 2007/0157191 | A1* | 7/2007 | Seeger | G06F 8/34 717/168 |
| 2007/0168384 | A1 | 7/2007 | Fildebrandt et al. | |
| 2007/0245319 | A1* | 10/2007 | Muenkel | G06F 8/34 717/136 |
| 2008/0120129 | A1* | 5/2008 | Seubert | G06Q 10/06 705/35 |
| 2008/0313008 | A1* | 12/2008 | Lee | G06Q 10/06 705/7.23 |
| 2009/0089309 | A1 | 4/2009 | Thimmel et al. | |
| 2009/0171679 | A1 | 7/2009 | Salgado et al. | |
| 2009/0222793 | A1 | 9/2009 | Frank et al. | |
| 2009/0328032 | A1 | 12/2009 | Crow et al. | |
| 2010/0082556 | A1* | 4/2010 | Srinivasan | G06F 8/72 707/693 |
| 2010/0153150 | A1* | 6/2010 | Prigge | G06Q 10/06 705/7.11 |
| 2011/0154302 | A1* | 6/2011 | Balko | G06Q 10/06 717/140 |
| 2012/0036514 | A1 | 2/2012 | Master et al. | |
| 2012/0158754 | A1 | 6/2012 | Mital et al. | |
| 2013/0239089 | A1 | 9/2013 | Eksten et al. | |
| 2013/0262626 | A1* | 10/2013 | Bozek | H04L 67/10 709/217 |
| 2014/0173558 | A1* | 6/2014 | Martinez Canedo | G06F 8/20 717/121 |
| 2014/0380205 | A1* | 12/2014 | Burckhardt | G06F 8/38 715/762 |
| 2015/0317154 | A1 | 11/2015 | Marimuthu et al. | |
| 2015/0339107 | A1 | 11/2015 | Krishnamurthy et al. | |

OTHER PUBLICATIONS

Hissam et al., Packaging Predictable Assembly, <http://download.springer.com/static/pdf/18/chp%253A10.1007%252F3-540-45440-3_8.pdf>, 2002, pp. 108-124.

Krieger et al., The Emergence of Distributed Component Platforms, IEEE Computer Society Press <http://citeseerx.ist.psu.edu/viewdoc/downloaddoi=1 0.1.1.466.9986&rep=rep1 &type=pdf>, Mar. 3, 1998, pp. 43-53.

Lorenz et al., Design-time Assembly of Runtime Containment Components, IEEE, available online at: http://ieeexplore.ieee.org/stamp /stamp.jsptp=&arnumber=868971, 2000, pp. 195-204.

Oreizy, Issues in the Runtime Modification, <http://citeseerx.ist.psu.edu/viewdoc/downloaddoi=10.1.1.51.8459&rep=rep1 &type=pdf>, Aug. 1996, pp. 1-8.

U.S. Appl. No. 14/717,155, Non-Final Office Action dated Apr. 21, 2016, 28 pages.

U.S. Appl. No. 14/717,155, Notice of Allowance dated Oct. 13, 2016, 14 pages.

* cited by examiner

EXAMPLE - APPLICATION DESIGN METADATA

```xml
1   <?xml version="1.0" encoding="UTF-8"?>
2   <SituationApplication xmlns="http://xmlns.oracle.com/2012/SCEM"
3       shortCode="OMAPP" productVersion="11.1.1.7.0.2" userAgent="SCEMDesigner/1.0">
4       <EventSources>
5           <EventSource uid="ESRC0002" name="SCEMEBSEventSource" type="AQ"/>
6       </EventSources>
7       <Events>
8           <Event uid="EVNT0006" name="SalesOrderCreated" type="SalesOrder" entityName="SalesOrder"/>
9           <Event uid="EVNT0007" name="SalesOrderBooked" type="SalesOrder" entityName="SalesOrder"/>
10          <Event uid="EVNT0008" name="SalesOrderLineCreated"
11              type="SalesOrderLine" entityName="SALESORDERLINE"/>
12          <Event uid="EVNT0009" name="Transaction" type="Transaction" entityName="Transaction"/>
13          <Event uid="EVNT0010" name="SCEMAlert" type="Alert" entityName="SCEMAlert"/>
14      </Events>
15      <Wires>
16          <Wire uid="WIRE0013">
17              <Source type="EventSource" uid="ESRC0002"/>
18              <Target type="Event" uid="EVNT0006"/>
19          </Wire>
20          <Wire uid="WIRE0014">
24          <Wire uid="WIRE0015">
28          <Wire uid="WIRE0016">
32          <Wire uid="WIRE0017">
36          <Wire uid="WIRE0018">
40          <Wire uid="WIRE0019">
44          <Wire uid="WIRE0020">
48          <Wire uid="WIRE0021">
52          <Wire uid="WIRE0022">
56          <Wire uid="WIRE0023">
60          <Wire uid="WIRE0024">
64          <Wire uid="WIRE0025">
68          <Wire uid="WIRE0026">
72      </Wires>
73      <Processors>
74          <Processor uid="PROC0002" name="OMDropShipLTOProcessor" type="LTO"/>
75      </Processors>
76      <AlertProcessors>
77          <AlertProcessor uid="APRC0002" name="OrderBookedAlert" type="SCEM-Alert"/>
78          <AlertProcessor uid="APRC0003" name="OrderLineReturnAlert" type="SCEM-Alert"/>
79      </AlertProcessors>
80      <Responses>
81          <Response uid="RESP0003" name="OMDropShipAlert" type="JMS"/>
82          <Response uid="RESP0004" name="OMDropShipLTOResponse" type="JMS"/>
83      </Responses>
84  </SituationApplication>
85
```

FIG. 7A

EXAMPLE - LOGICAL TRANSACTION METADATA

```xml
1   <?xml version="1.0" encoding="UTF-8"?>
2   <SituationContext xmlns="http://xmlns.oracle.com/2012/SCEM" productVersion="11.1.1.7.0.2">
3     <SCEMTransaction>
4       <EntityRelations>
5         <EntityRelation>
6           <Name>SalesOrderToLineRelation</Name>
7           <RelationshipType>1-M</RelationshipType>
8           <ParentEntity>SalesOrder</ParentEntity>
9           <ChildEntity>SALESORDERLINE</ChildEntity>
10          <AttributeMatchings>
11            <AttributeMatching>
12              <ParentAttribute>headerid</ParentAttribute>
13              <ChildAttribute>solheaderid</ChildAttribute>
14            </AttributeMatching>
15          </AttributeMatchings>
16          <RelationQualifiers/>
17        </EntityRelation>
18      </EntityRelations>
19      <TransactionObject>
20        <Attribute name="TRXKEY" type="string"/>
21        <Attribute name="EVENTNAME" type="string"/>
22        <Attribute name="LTOTIMESTAMP" type="date"/>
23        <Attribute name="LTOENDDATE" type="dateTime"/>
24        <Entity primaryKeyAttribute="lineid" name="SALESORDERLINE">
25          <Attribute name="solinvoicetocustname" type="String"/>
26          <Attribute name="quotenumber" type="int"/>
27          <Attribute name="soltransactionphasecode" type="String"/>
28          <Attribute name="solurl" type="String"/>
29          <Attribute name="lineid" type="int"/>
30          <Attribute name="shippedquantity" type="float"/>
31          <Attribute name="linecategorycode" type="String"/>
32          <Attribute name="revreceventcode" type="String"/>
33          <Attribute name="invoicedquantity" type="float"/>
34        </Entity>
35        <Entity primaryKeyAttribute="headerid" name="SalesOrder">
36          <Attribute name="hhreleasecomment" type="String"/>
37          <Attribute name="shiptoaddress4" type="String"/>
38          <Attribute name="cancelledflag" type="String"/>
39          <Attribute name="shiptoaddress1" type="String"/>
40          <Attribute name="operatingunit" type="String"/>
41          <Attribute name="shiptoaddress2" type="String"/>
42          <Attribute name="sourl" type="String"/>
43          <Attribute name="freightterms" type="String"/>
44          <Attribute name="shiptoaddress5" type="String"/>
45        </Entity>
46      </TransactionObject>
47      <PurgeCondition>{Transaction.FLOWSTATUSCODE} IN ('Closed', 'Cancelled')</PurgeCondition>
48    </SCEMTransaction>
49  </SituationContext>
50
```

FIG. 7B

EXAMPLE – ALERT CONFIGURATION METADATA

FIG. 7C

GENERATING RUNTIME COMPONENTS

RELATED APPLICATIONS

The present application is a continuation of U.S. Nonprovisional patent application Ser. No. 14/717,155, filed May 20, 2015, which claims priority under 35 U.S.C. § 119(e) to U.S. Provisional Patent Application No. 62/001,816, filed May 22, 2014, entitled "SYSTEMS AND METHODS TO GRAPHICALLY BUILD AND AUTO-GENERATE A COMPLEX EVENT TRACKING APPLICATION FOR ENTERPRISE SYSTEMS," the entire contents of each of which are incorporated herein by reference for all purposes.

BACKGROUND OF THE INVENTION

Embodiments of the present invention relate generally to systems and methods for generating runtime components in various hardware and software-based systems. More specifically, certain embodiments of the present invention describe a design-time interface by which applications may be designed, generated, and deployed in accordance with within underlying source systems of a hardware/software system.

Operations of large and small businesses, educational institutions, and governmental entities are increasingly global, outsourced, and complex. Effectively coordinating and managing tasks across large and disparate systems is a daunting task. Such systems often include various hardware and networking devices having different manufacturers, configured at different times and in different situations, and operating under different conditions in different geographic locations. Many systems also combine legacy hardware and software systems with newly implemented systems, causing potential issues for capability, security, and reliability. Moreover, many such systems are required to support an enormously diverse set of functionality within their respective organizations. The hardware, communications networks, software, and data infrastructure of many systems are responsible for housing and supporting different departments within the organization, and providing services for different users (both internal and external to the enterprise) operating different user devices in different networks, and having different roles and levels of access within the system. Designing, building, and deploying applications for such systems is often challenging.

BRIEF SUMMARY OF THE INVENTION

Embodiments of the invention provide systems and methods for generating runtime components in various hardware and software-based systems. More specifically, certain embodiments of the present invention describe a design-time interface by which simple or complex applications may be designed, generated, and deployed in accordance within the underlying source systems in a hardware/software system. In certain embodiments, a design-time interface may be provided with graphical components corresponding to the source systems within a software system. Designs for applications may be received via the design-time interface, and sets of runtime components may be generated to implement the received designs. In some examples, underlying source systems within the hardware and software system may be invoked (e.g., using application programming interfaces (APIs), services, etc.) in order to generate and customize the runtime components in accordance with the graphical components defined during the design process. Additionally, metadata files or other metadata objects may be generated corresponding to the application design, said metadata defining application components such as event sources, events, component relationships, conditions or patterns for generating alerts, and/or response routing information.

In some embodiments, the relationships between different components in an application design may be defined by a user via the design-time interface. For example, the user may use graphical wires, arrows, or other linking objects to define the interactions between different components. In other cases, a runtime component designer may automatically determine relationships between components without input from the user. For instance, the runtime component designer may determine the relationships between components in the design based on a compatibility matrix or similar component compatibility data, and/or based on relative placement locations of the components the workspace of the design-time interface. Additionally, certain embodiments of design-time interfaces for applications may be dynamically determined and/or populated for specific designs, users, and systems. For instance, after receiving a selection of first graphical component via the design-time interface, a set of customizable features (or properties) for the first graphical component, and/or a subset of related components compatible with the first graphical component, may be selected and rendered on the design-time interface.

In further embodiments, after the runtime components for an application design have been generated and deployed within the hardware/software system, changes in the underlying hardware or software components of the system may require the runtime components to be regenerated and redeployed. For instance, if an underlying source system, such as a database, network infrastructure or device, computer server, or software system, is upgraded, altered, or replaced, then any runtime components currently deployed or dependent on those source systems may need to be redesigned and/or regenerated. In certain cases, an updated set of runtime components may be automatically regenerated and redeployed within the system, while in other cases, design-time interfaces may be generated and populated to allow users to redesign, customize, and regenerate a new set of runtime components based on the changes to the underlying source systems.

BRIEF DESCRIPTION OF THE DRAWINGS

FIGS. 7A-7C are illustrative metadata files corresponding to an example application design, according to one or more embodiments of the present invention.

DETAILED DESCRIPTION OF THE INVENTION

Figure 1:
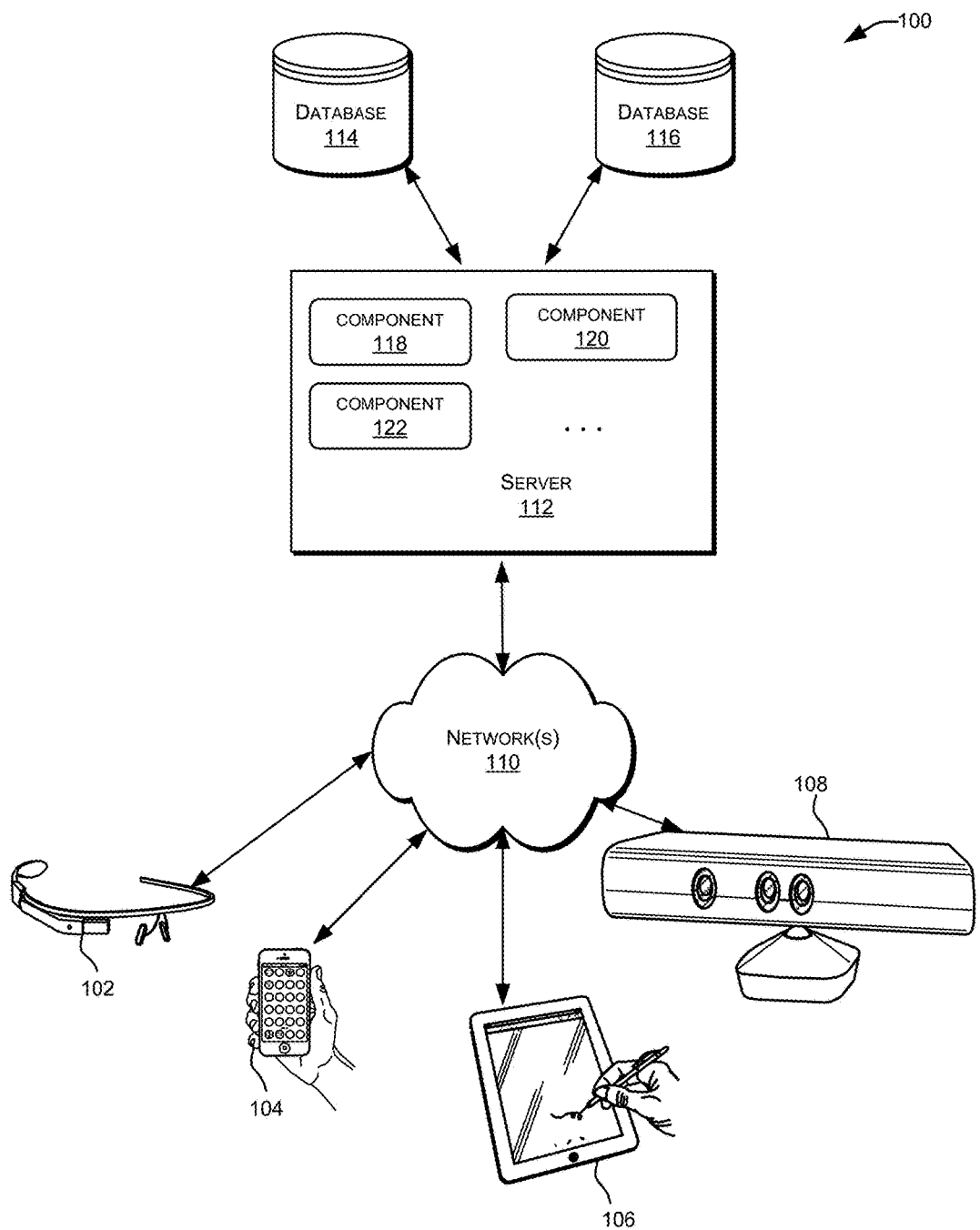
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for generating runtime components in various hardware and software computing systems. More specifically, certain embodiments of the present invention describe a design-time interface by which simple or complex applications may be designed, generated, and deployed based on the underlying source systems in a computing system. As discussed in detail below, such embodiments may provide an intuitive, event-focused, application designer that may automatically wire a multitude of technologies seamlessly, and may allow complex applications to be designed, customized, and built quickly and easily. In some embodiments, a design-time interface may be generated to allow selection, customization, and linking of graphical components corresponding to the underlying source systems of the computing system. Application designs may be translated into metadata objects and/or may be used to generate and deploy runtime components within the computing system to implement the application functionality. Moreover, multiple incoming streams of events from various different systems may be functionally linked into a Logical Transaction Object (LTO), thereby creating an overall context for each application design. Such LTOs may provide real-time, centralized views of the end-to-end application being implemented by separate runtime components.

Additionally, in some embodiments, design-time interfaces may allow users to easily define exception cases and/or patterns for an application, so that real-time notifications or alerts may be sent out when these cases or patterns are identified at runtime. Users may define and customize such alerts, and may define the alert conditions based on complex time-based or non-time based event patterns, including occurrence or non-occurrence of events. These features may allow for the design, generation, and deployment of various different types of applications, such as supply chain event management (SCEM) applications, inventory management applications, enterprise resource planning (ERP) applications, document management applications, eCommerce applications, customer relationship management (CRM) applications, and the like. For instance, a supply chain event management (SCEM) application designed and implemented in accordance with the features described herein may monitor, track, and correlate all correlate all supply chain events against relevant expected milestones within system processes. Such an SCEM application may monitor activity in real-time, sense problems and respond with alerts and notifications to appropriate users and partners.

In use, various embodiments may provide the ability to monitor various events of a logical end-to-end transaction in a multi-tiered computer system, including activities carried out by the third-party systems (e.g., customers, suppliers, vendors, carriers, etc.) to detect an exception and potentially automatically trigger a remedial action. For example, a certain implementation may monitor meaningful events of an end-to-end customer order drop shipment flow, including manufacturing and/or shipping events occurring at the vendor, and may raise an exception if any event does not occur within an expected time. Additionally or alternatively, certain embodiments may correlate various events in a multi-tiered system and raise alerts for actions if delay or non-occurrence of one event impacts future activities of the same or other multiple transactions. Other embodiments may additionally or alternatively provide an ability to subscribe to an external event streams such as traffic alerts, sensors, RSS feeds, RFID feeds, and the like. The incoming data from these event streams may be synthesized and correlated with the state of the application in the system, to arrive at potential exception or an action. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
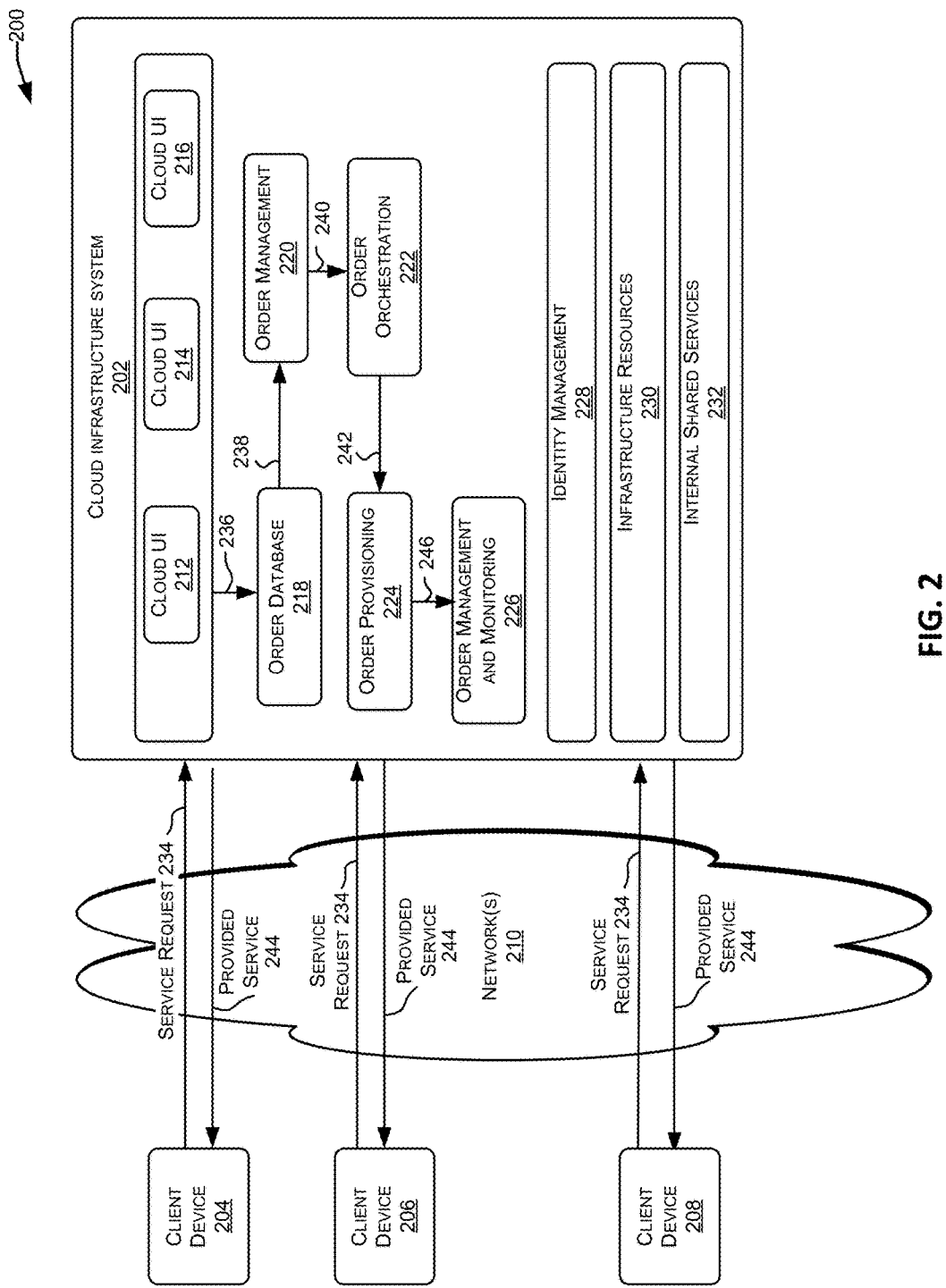
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
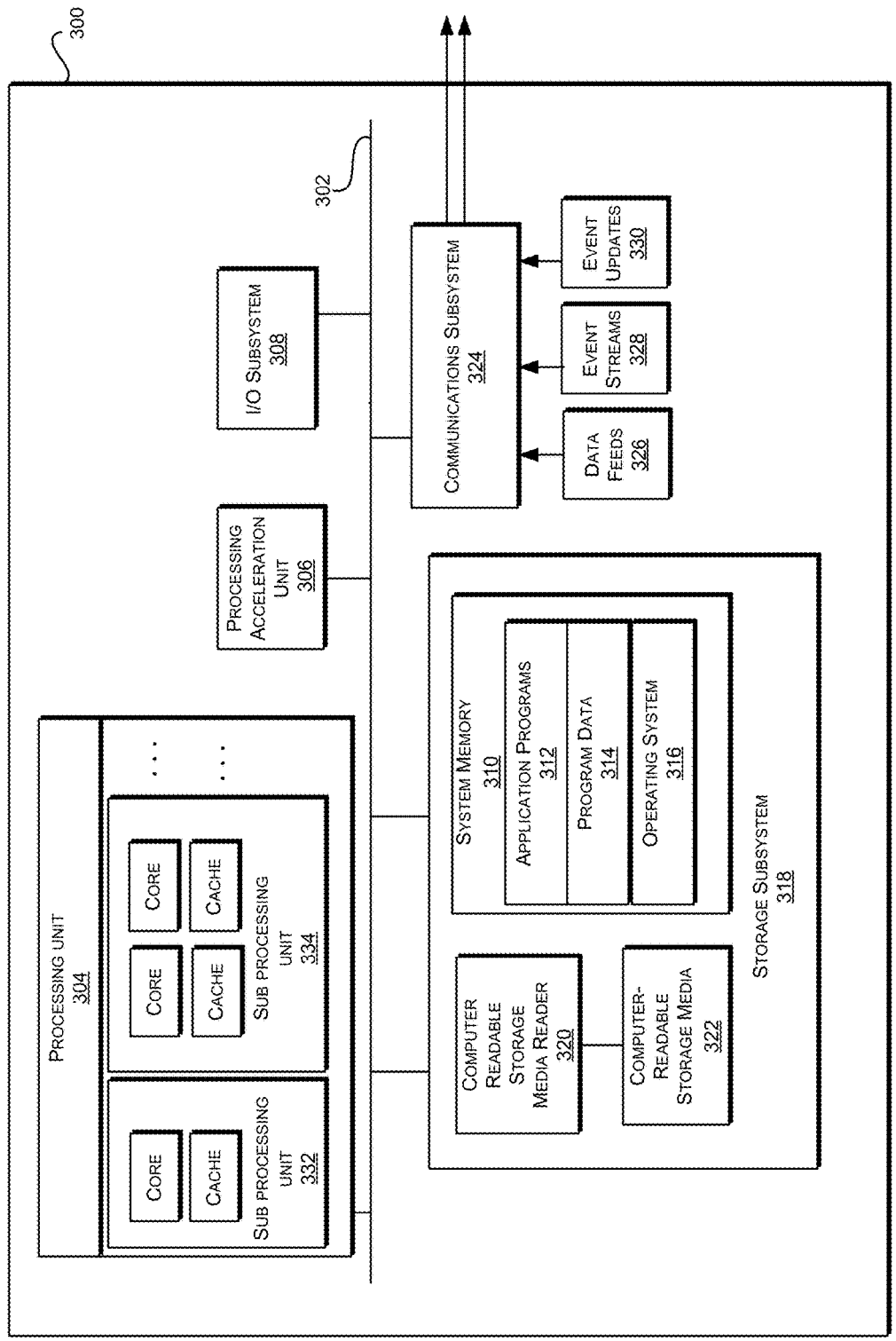
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

As introduced above, embodiments of the invention provide systems and methods for generating runtime components in various hardware and software computing systems. More specifically, certain embodiments of the present invention describe a design-time interface by which simple or complex applications may be designed, generated, and deployed in accordance with the underlying source systems in a computing system. As discussed below, such embodiments may provide an intuitive, event-focused, application designer that may automatically wire a multitude of technologies seamlessly and may allow complex software applications to be designed, customized, and built quickly and easily. In some embodiments, a design-time interface may be generated to allow selection, customization, and linking of graphical components that corresponding to the underlying source systems of the computing system. Application designs may be translated into metadata objects and/or may be used to generate and deploy runtime components within the computing system to implement the application functionality. Moreover, multiple incoming streams of events from various different systems may be functionally linked into a Logical Transaction Object (LTO), thereby creating an overall context for each application design. Such LTOs may provide real-time, centralized views of the end-to-end application being implemented by separate runtime components.

In use, various embodiments may provide an ability to monitor various events of a logical end-to-end transaction in a multi-tiered system, including activities carried out by the third-party systems (e.g., customers, suppliers, vendors, carriers, etc.) to detect an exception and potentially automatically trigger a remedial action. For example, a certain implementation may monitor meaningful events of an end-to-end customer order drop shipment flow, including manufacturing and/or shipping events occurring at the vendor, and may raise an exception if any event does not occur within an expected time. Additionally or alternatively, certain embodiments may correlate various events in a multi-tiered system and raise alerts for actions if delay or non-occurrence of one event impacts future activities of the same or other multiple transactions. Other embodiments may additionally or alternatively provide an ability to subscribe to an external event streams such as traffic alerts, sensors, RSS feeds, RFID feeds, and the like. The incoming data from these event streams may be synthesized and correlated with the state of the application in the system, to arrive at potential exception or an action. Various additional details of embodiments of the present invention will be described below with reference to the figures.

Figure 4:
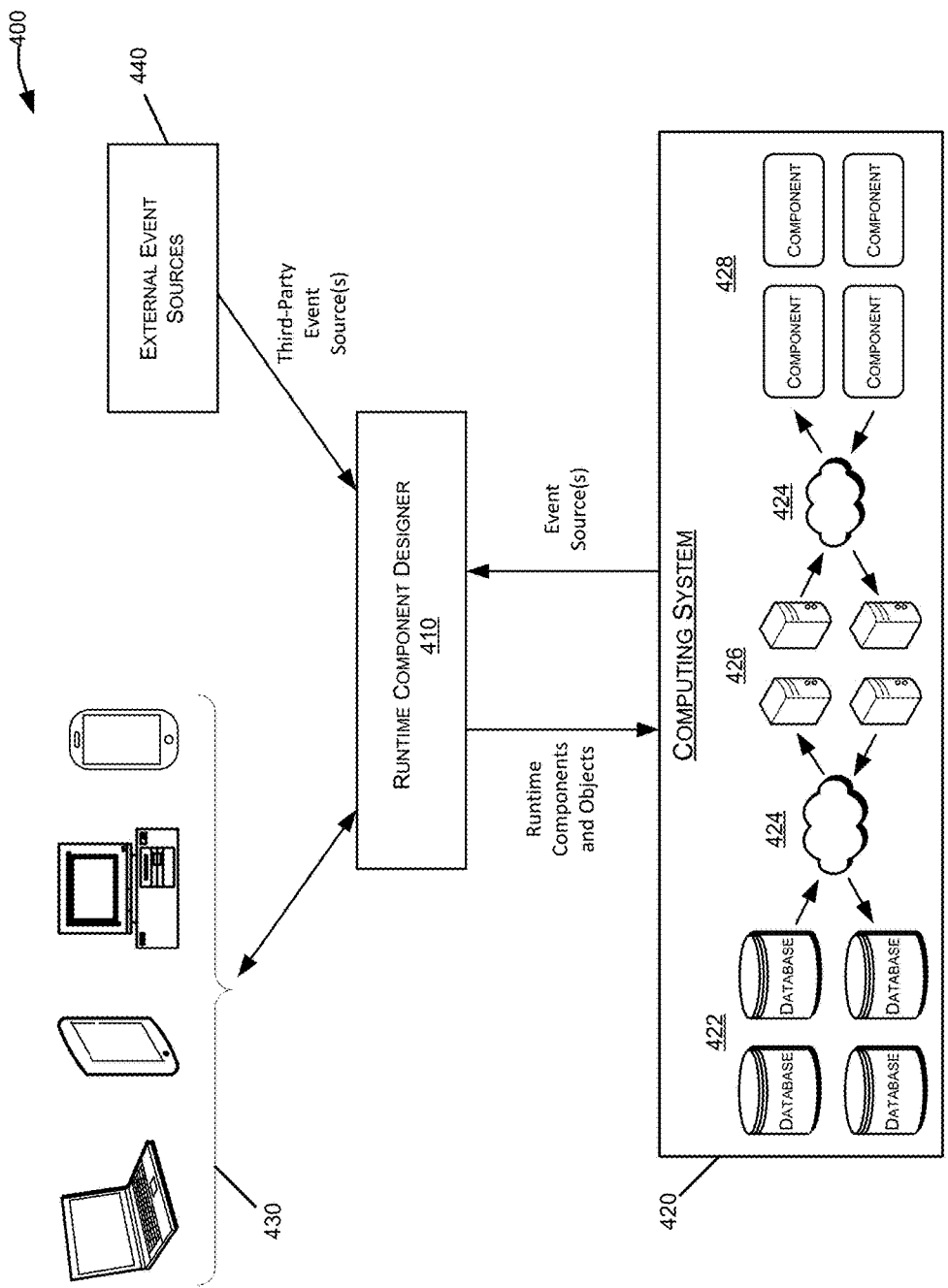
FIG. 4 is a block diagram illustrating, at a high-level, elements of a system for generating runtime components for a computer system, in which embodiments of the present invention may be implemented.

FIG. 4 is a block diagram illustrating a computing environment 400 for generating runtime components for a hardware and software computing system according to one or more embodiments of the present invention. Computing environment 400 illustrated in this example may correspond to a high-level computer architecture designed to provide computing resources and functionality to various user devices. As shown in FIG. 4, the computing environment 400 may be implemented as a multi-tier computer architecture, which may include web-based and/or cloud-based implementations, and in which various user devices 430 and other external systems 440 interact with one or more middle-tier systems (e.g., runtime component designer 410, to design and deploy runtime components within a hardware and software system 420.

In various embodiments, computing system 420 may range from a small and simple computing system to a large and highly complex system including hardware, software, and network components designed to integrate with other such systems to support the computing needs of organization users. Computing system 420 may be component-based, complex, scalable, and/or distributed. In some embodiments, the hardware, software, storage, and networking components of the computing system 420 (e.g., components 422-428) may be deployed on various devices and platforms across private organization networks, intranets, and/or the wide-area public networks (e.g., the Internet). Some or all of the underlying systems 422-428 within the computing system 420 may be designed to implement system-wide security, administration, and maintenance policies. In some cases, the software applications 428 of the system 420 may be designed by third-party application service providers (not shown), and may be accessible via the system 420 as on-premise or hosted services 428, such as SaaS and web-based applications. Additionally, computing system 420 may correspond one or more cloud computing systems, in which some or all of the underlying source systems and resources 422-428 reside on a cloud and are accessible to the devices within the environment 400 through a network (e.g., the Internet) as an on-demand service. System 420 may also correspond to a hybrid cloud in which certain source systems and resources 422-428 may reside on a cloud while others reside on-premises (e.g., in an organization data center). Different computing systems may be designed having different computer architectures and functional/logical designs in order to implement one or more context-specific computing systems. For example, the computing system 420 may be implemented as a supply chain event management (SCEM) system, enterprise resource planning (ERP) system, document management system, eCommerce system, customer relationship management (CRM) system, and the like. In various examples, systems 420 may include various development platforms, for example, Java system platforms designed to allow application developers to create large-scale, multi-tiered, scalable, reliable, and secure network applications for the system 420.

As discussed in more detail below, the runtime component designer 410 may interact with one or more user devices 430, external event sources 440, and/or various hardware or software components within the computing system 420 (e.g., databases 422, network devices 424, computer servers 426, and software components 428) to design, generate, and customize runtime components. Such runtime components may correspond to various software applications designed for deployment within a specific system 420 or elsewhere in a specific computing environment 400. For example, runtime components designed and generated for deployment with computing system 420 may include applications designed to interface or integrate with other applications in the system 420, and may be designed for deployment across one or more networks associated with the computing environment 400 and systems 420 (e.g., corporate networks, intranets, and/or the Internet) while satisfying system-wide requirements for security and administration. The runtime components designed via a runtime component designer 410 and deployed within one or more systems 420 may range from relatively small and simple applications to large and complex applications. Such applications may be multi-user, multi-developer, and/or multi-device applications. In some cases, runtime components may designed, generated, and deployed to sustain continuous and long-lived operation within the computing environment 400, and to support scalability and allow for maintenance, monitoring, and administration. Runtime components/applications may execute in coordination with other runtime components/applications using network distributed resources to analyze large amounts of system data and/or perform environment-wide and system-wide parallel processing tasks. These runtime components/applications may be deployed across multiple systems 420 and multiple computing environments 400, and may interoperate with many other associated applications.

The specific application types and functional examples of runtime components designed, generated, and deployed herein may depend on the computer architecture(s) and functional design(s) of the associated computing environments 400 and systems 420. For instance, within a SCEM system, ERP system, CRM system, or the like, various runtime components may be designed to function as payment systems, payment processing systems, automated billing systems, tracking systems, shipping systems, email marketing systems, client management systems, call center systems, organization search systems, and/or messaging and collaboration systems. These non-limiting examples, among other various types of runtime components, may be implemented as web-based applications, cloud-based applications, small and medium enterprise (SME) mobile applications, and the like. As discussed below, the runtime component designer 410 and other components described herein provide an intuitive, event-focused, application designer that may automatically wire a multitude of technologies seamlessly, and allowing complex designs and integration between any of these types of applications.

Runtime component designer 410 may be implemented in hardware, software, or a combination of hardware and software. As discussed in more detail below, the runtime component designer 410 may interact with one or more user devices 430, external event sources 440, and/or various computing system 420 hardware or software components (e.g., databases 422, network devices 424, computer servers 426, and software components 428) to design, generate, customize, and deploy runtime components within the computing system 420. In some embodiments, the runtime component designer 410 may be implemented as part of the computing system 420 or other middle-tier software applications. For example, the runtime component designer 410 may be a software component executing on the same computer server 426 as one or more software applications 428. In other embodiments, the runtime component designer 410 may be executed on dedicated hardware and/or software, for example, on a separate computer server that monitors and communicates with user devices 430, external systems 440, and various source systems 422-428 within the computing system 420. In some cases, runtime component designer 410 may be dedicated to a specific system 400, whereas in other cases, a single runtime component designer 410 may interact with multiple different systems maintained by different organizations.

In the example computing environment 400 shown in FIG. 4, the runtime component designer 410 may generate and populate a design-time interface for runtime components based on data received from the source systems within the computing system 420, external event sources 440, and user devices 430. Users interacting with the runtime component designer 410 via user devices 430 may design and customize simple or complex applications that perform various functionality and invoke any number of underlying source systems 422-428 within the computing system 420. Such applications may be designed and customized by the runtime component designer 410 using a combination of input from user devices 430, the computing system 420, and transaction logic. The runtime component designer 410 also may define the relationships between the components of an application, either based on input from a user designing the application or automatically based on application configuration data. The runtime component designer 410 may then generate a set of runtime components corresponding to the customized application designed by the user 430, and may deploy the runtime components within the computing system 420.

In some embodiments, the functionality and/or interfaces supported by the runtime component designer 410 may be determined dynamically based on the characteristics of the underlying source systems 422-428 and other hardware, software, and network components of the computing environment 400. For example, the runtime component designer 410 may support the functionality to design runtime components for specific systems 420, in which the designed applications are automatically configured to integrate or interface with other applications and systems in the computing environment 400. The runtime component designer 410 also may ensure that applications are designed, generated, and deployed to be scalable and/or executable as distributed applications within the computing environment 400, and also that such applications may be deployed on any of the multiple host devices, platforms, and networks within the appropriate systems 420 of the computing environment. Additionally, the runtime component designer 410 may implement the support, within the newly designed applications or updated applications, for any system-wide security, administration, and maintenance policies within the system 420 and/or computing environment 400.

Figure 5A:
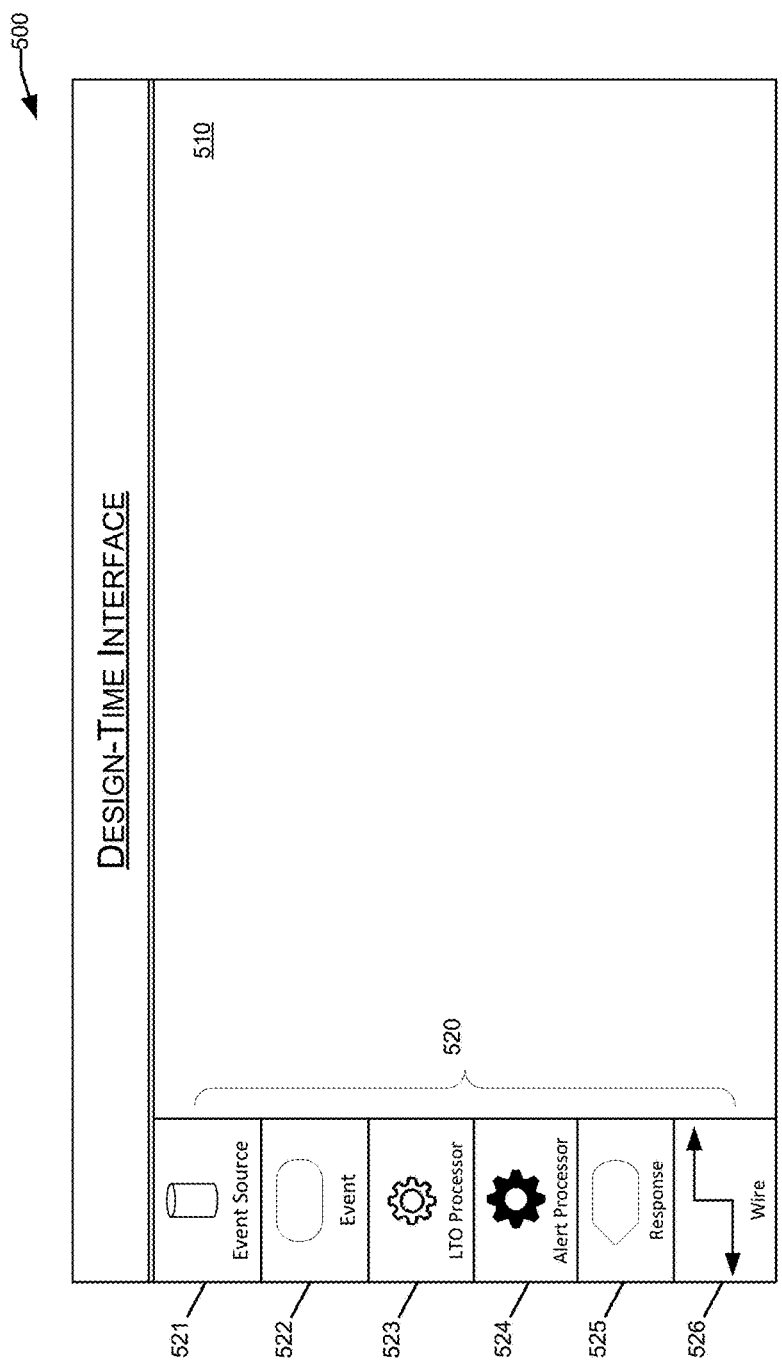
FIGS. 5A-5B illustrate an example design-time interface for generating runtime components in a computer system, according to one or more embodiments of the present invention.

FIG. 5A is an example of a design-time interface 500 for generating runtime components in a computing system. In this example, the design-time interface 500 may be generated by runtime component designer 410, to allow for the design of software applications that may be generated and deployed as runtime components within system environment 200. In this example, the design-time interface 500 includes a workspace 510 and a toolbar 520 of component objects 521-526 that may be used to design an application. In this example, the component objects include an event source object 521, an event object 522, a Logical Transaction Object (LTO) processor object 523, an alert processor object 524, a response object 525, and a wire object 526. It should be understood that the layout and set of component objects 521-526 used in design-time interface 500 is illustrative only, and that different layouts and different sets of component objects may be used in different implementations. For example, as described below, the layout and functionality of the design-time interface 500 may be based on user preferences and/or the device capabilities of different user devices 430. Additionally, the sets of component objects 520 displayed in a design-time interface 500 may be based on the source systems 422-428 within a corresponding computing system, various external sources (e.g., event sources 440), as well as the permissions or access levels of the users and user devices 430 interacting with the design-time interface 500.

In some embodiments, the graphical components 520 of the design-time interface 500 may be customized and/or populated on the fly by the runtime component designer 410 based on the current characteristics of the computing system 420, the user and user device 430 accessing the interface 500, and various other real-time factors. For example, the design-time interface 500 in FIG. 5A may support drag-and-drop functionality to allow users select, position, and connect various components 520 within the workspace 510. In some embodiments, various aspect of the layout of the design-time interface 500, such as the size, shape, and orientation of the workspace 510, the size, size, and positioning of the component toolbar 520 may be determined on-the-fly by the runtime component designer 410 based on user preferences and/or user device capabilities. The functionality of the design-time interface 500 also may be customized based on user preferences and/or user device capabilities. For instance, a tablet computer user device 430 may support touchscreen functionality to allow users to position graphical components on the workspace 510, whereas a desktop computer user device 430 may alternatively support click-and-drag functionality.

Additionally, in some implementations, the graphical components 520 available in the design-time interface 500 may depend on the underlying source systems 422-428 of a corresponding computing system 420, preferences or permissions associated with users of the design-time interface 500, and other factors. For example, if an computing system 420 associated with the design-time interface 500 does not current include the underlying systems to support user alerts (or only supports certain types of alerts), then the design-time interface 500 might not include an alert processor graphical component 524 (or only certain types of alert processor components). Additionally, different types of underlying source systems may be rendered as different graphical components on the design-time interface 500, such as a first event source graphical component and a second external event source graphical component within the component toolbar 520. Moreover, if the user currently interacting with the design-time interface 500 does not have full access permissions to all of the underlying source systems in the computing system 420, then the runtime component designer 410 may limit the graphical components shown in the design-time interface 500 in accordance with the user's permissions. For example, the runtime component designer 410 may query the computing system 420 to determine that a user does not have access to subscribe to certain events, access certain event sources, invoke certain alert or notification services, and the like. In response, the runtime component designer 410 may populate the design-time interface 500 only with the graphical components for which the specific user is permitted access.

Figure 5B:
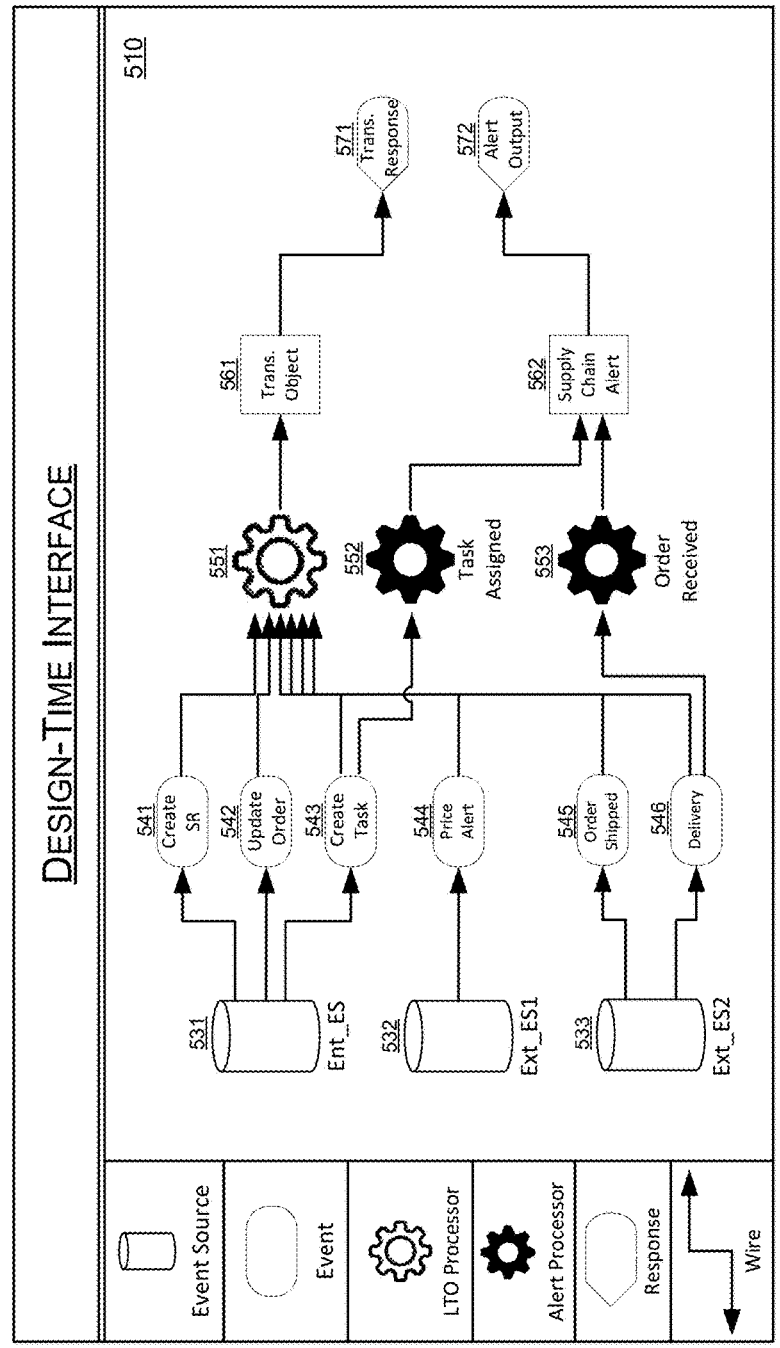

FIG. 5B is an example of the design-time interface 500 including an application design within the workspace 510. As discussed below, a design for an enterprise application may be created by selecting and placing various components 520 on the workspace 510, setting properties to customize the selected components 520, and defining the relationships between the selected components 520. In this example, a user has created an application design including multiple event sources 531-533 (including an event source and external event sources), various events 541-546 from the event sources 531-533, processors 551-553 (including LTO processors and alert processors), data objects 561-562, and response objects 571-572. Additionally, each graphical component in workspace 510 may be connected to one or more other graphical components via unidirectional or bi-directional arrows (or wires) defining the relationships between the components in the design.

The example design shown in FIG. 5B may correspond to any number of event-based applications for tracking and responding to various conditions relevant to an organization, such as a supply chain management application, a report generation application, a system maintenance application, etc. For instance, the software application design in FIG. 5B may correspond to a supply chain event management (SCEM) application that is capable of subscribing to and listening for various events 541-546 from multiple different event sources 531-533. The events 541-546 in this example may be events that occur on business entities such as service requests, tasks, orders, prices, etc., from e-business event sources. In other examples, the events may correspond to physical states or occurrences (e.g., current inventory states, physical orders shipped or received, etc.) inside or outside of the computing system 420, or events occurring to the hardware and software resources of the computing system 420, such as events based on processing loads and availabilities of system servers, memory usage, numbers of network connections, numbers of software objects created, number of users accessing the software, numbers of client connections, occurrences of network congestion, performance measurements of system hardware, software, or networks, and the like.

In addition to the events 541-546 and event sources 531-533, the application design in FIG. 5B may include an LTO processor 551 to provide centralized view of the complete application. The LTO processor 551 may collect and analyze data describing how each of the events 541-546 are related to one another, thus providing a real-time centralized view of the entire end-to-end business transaction. The LTO processor 551 may create a transaction object 561 that may be used to track business transactions occurring across disparate and heterogeneous systems. Additionally, alert processors 552-553 may collect and analyze data based on pre-set conditions and/or patterns based upon which the application may provide alerts. The alert processors 552-553 may generate one or more alert objects 562 that contain attributes using which the application may send an alert to different stake holders via email, SMS or to the dashboard, etc. Alert object 562 may include the alert recipients (e.g., user device(s) 430, specific system users or administrators, event logs, etc.), the alert type (e.g., email, simple message service (SMS) message, phone call, page, log file, etc.), the format and preferences for the alert, and/or the media and/or communication network(s) to be used for transmitting the alert. Finally, response objects 571-572 may enable dedicated channels to the presentation layer, which may be, for example, a business activity monitoring (BAM) data object, standard service-oriented architecture (SOA) notifications, and the like.

In order to create the application design in FIG. 5B, the design-time interface 500 may allow users to select and place various components 520 on the workspace 510. In some embodiments, the design-time interface may provide users the functionality to set the features (or properties) of each component in the design. For instance, after selecting placing a new component 520 on the workspace 510, the design-time interface may display an editable list of component features/properties for the newly placed component, allowing the user to input the properties to define and customize the component that will be added to the application design. For example, if an event source object 521 is selected and placed within the workspace 510, an editable list of event source properties may be displayed within the design-time interface to allow the user to define the specific name and/or network location of the event source (e.g., by selecting an event provider within the computing system 420 or an external event source with events accessible to the system 420). Subsequently, if an event object 522 is selected and placed within the workspace, a dropdown box or other interface may be provided within the design-time interface containing a selectable list of all aggregated events provided by any of the previously selected event sources on the workspace. Similarly, if an LTO processor component 523 or alert processor component 524 is placed on the workspace 510, the design-time interface may invoke an editable user interface to allow the user to define how each of the events 541-546 are related to one another, to define the conditions and/or patterns for responding or not responding to the individual events and combinations of events, and to define the conditions and/or patterns for providing alerts in response to individual events and combinations of events.

In some embodiments, the component features (or properties) that may be configured via the design-time interface, and/or the limits or ranges of how such component features may be configured, may be dynamically determined by the design-time interface. For example, a graphical component 520 selected for an application design may relate to one or more hardware or software components within the computing system 420. In such examples, a selectable list of the possible hardware or software components may be dynamically generated and provided to the user in real-time, to allow the user to select the appropriate source systems within the computing system 420. For instance, an illustrative computing system 420 may support only certain alert types and not others, and/or may provide include visualization layers but not others. In this case, if a user selects and places an alert processor graphical component 524 on the workspace 510, then the runtime component designer 410 may dynamically retrieve all of the available alert types and visualization layers from the underlying source systems of the computing system 420, and may display those as user-selectable options in a list on the design-time interface.

Additionally, in certain embodiments, the limits of user configuration of the component features (or properties) in the design may be determined based on the access permissions of a user interacting with the design-time interface. For instance, if a user has access permissions to subscribe to certain events and/or event sources but not to other events and/or event sources, then the user's level of access permissions may determine which events and event sources are displayed when the user selects an event component 521 or event source component 522. Similarly, users in an computing system 420 may be assigned different levels of access to different databases, alert systems, visualization systems, processing resources, hardware and network resources, etc., within the computing system 420. Accordingly, the user's options for setting features (or properties) for components within the design-time interface may be limited by the user's access permissions to the hardware, software, and network resources of the computing system 420. Moreover, in some embodiments, the limits of user configuration of the component features (or properties) in the design may be determined based on the current levels of hardware, software, or network resource availability for the relevant source systems within the computing system 420. For example, if a user selects a graphical component 520 that may relate to underlying database 422, network device 424, computer server 426, or software component 428 within the computing system, then the user's options within the design-time interface for setting features (or properties) for the selected component may be based on the different levels of availability of the underlying resources 422-428, such as the current number of users or connections, current response time metrics, memory availability on different databases or servers, processing availability on different servers, bandwidth availability on different networks, instances of network congestion, etc.

The example application design shown in FIG. 5B also includes wires, depicted as unidirectional or bi-directional arrows, that connect each of the graphical components in workspace 510. The wires may be defined manually by users in some cases, for instance, by clicking and/or dragging within the workspace 510 to identify a start component and endpoint component for each wire. In certain embodiments, the runtime component designer 410 may automatically create the wiring on the workspace 510 to define the relationships between the graphical components. For example, the runtime component designer 410 may determine the component relationships based on compatibility and/or the location of the components placement within the workspace 510. If there are multiple possibilities for defining the component relationships, the runtime component designer 410 may initially create a set of wires within the workspace corresponding to the most likely or most popular set of component relationships, and then may allow the user to add, remove, or edit the wires to define a different set of desired component relationships for the application design.

Figure 6:
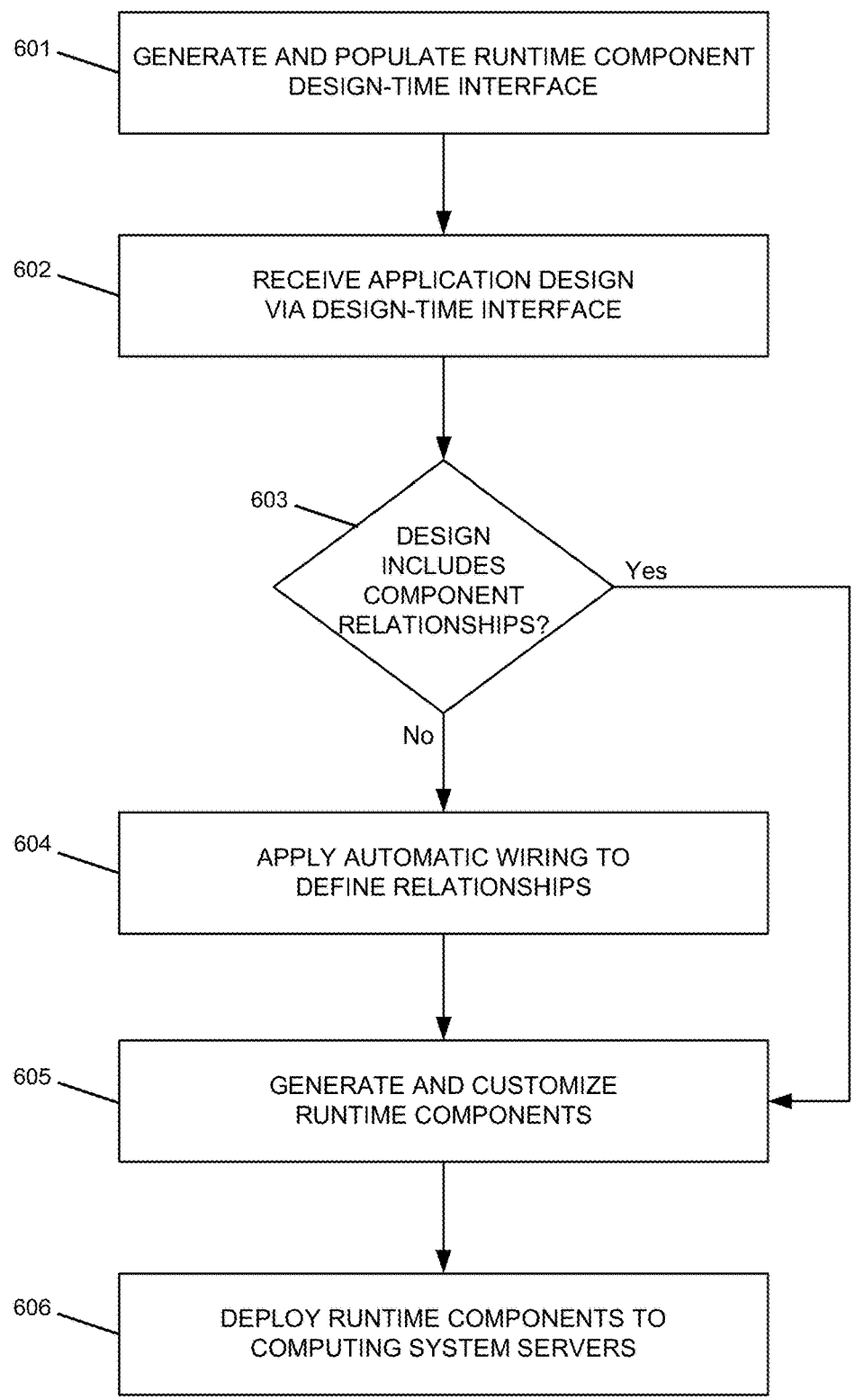
FIG. 6 is a flowchart illustrating a process for generating runtime components in an computer system, according to one or more embodiments of the present invention.

FIG. 6 is a flowchart illustrating the generation of a set of runtime components corresponding to an application design.

As described below, the steps in this process may be performed by one or more components in the example computing environment 400, such as a runtime component designer 410, in conjunction with various system components 422-428, user devices 430, and/or external systems 440. However, it should be understood that the design, generation, and deployment of runtime components need not be limited to the specific system and hardware implementations described above in FIGS. 1-4, but may be performed within other hardware and system environments comprising other combinations of the hardware and software components described herein. Further, although the example of FIG. 6 relates to creating a new set of runtime components corresponding to a newly designed application, similar processes and techniques may be used to modify or delete existing runtime components deployed within the computing system 420.

In step 601, the runtime component designer 410 may generate and populate a runtime component design-time interface. In some cases, an interface such as the illustrative design-time interface 500 shown in FIG. 5A may be generated by the runtime component designer 410 and provided to one or more user devices 430 in response to user requests to create or modify runtime components within the computing system 420. For instance, a user device 430 may directly access a user interface (e.g., a web-based interface or standalone client application interface) provided by the runtime component designer 410 to allow the user device to design an application to be deployed within system 420. In other examples, a software application executing on a user device 430 may invoke an API, web service, or application service of the runtime component designer 410 to programmatically generate and populate a design-time interface. As discussed above in relation to FIG. 5A, different possible layouts and functionalities may be used for a design-time interface in step 601, based on the identity of the requesting user, user preferences, user device capabilities, and the like. Additionally, the population of the design-time interface in step 601 may be based on the source systems 422-428 within the computing system 420, as well as based on various external sources and the user permissions of the requesting user, etc.

In step 602, the runtime component designer 410 may receive a design of a new (or modified) application via the design-time interface. As discussed above in relation to FIG. 5B, the overall design of the application, the underlying source systems upon the application may be built, the various events and event sources, and the various alerts and responses of the application design may be based on the specific implementation and current state of the computing system 420 and its various components 422-428, along with other factors such as the availability of external event sources 440 and other external systems, user permissions, and the like.

In step 603, if a user has not fully defined the relationships between components in the application design (603:No), then in step 604 the runtime component designer 410 may automatically determine and define the relationships in the application design. As discussed above, one or more different configurations of relationships may be possible based on the components selected by the user and/or the features (or properties) of those components selected by the user. In some embodiments, the runtime component designer 410 may determine the relationships between components in the design based on a compatibility matrix or other compatibility and incompatibility data for the different components, and/or based on the placement locations of the components within a design workspace. Alternatively, if the relationships between each of the components in the design has been fully defined (603:Yes), for example, by using unidirectional or bidirectional wires within the design-time interface, then the runtime component designer 410 need not define the component relationships in step 604, but may still confirm the validity of the user-defined relationships in some embodiments.

In step 605, the runtime component designer 410 may generate and customize the runtime components corresponding to the application design. The runtime components generated in step 605 may correspond to any type of hardware, software, data, or network component supported by the computing system 420. Application designs may include various combinations of simple and complex components that may be generated and deployed within the computing system 420. Such technology components may include, for example, service-oriented architecture (SOA) artifacts, complex event processing (CEP) applications that may or may not use in-memory caches (e.g., (e.g., Oracle Event Processor (OEP) applications using an Oracle Coherence cache), various data objects and messaging services for business activity monitoring (BAM) software, as various other event systems, alert systems, and/or visualization systems within the computing system 420. The components may be generated using component templates stored within the computing system 420 or in secure storage outside of the system 420 (e.g., within the memory of an external runtime component designer 410), or may be generated using application programming interfaces (API) exposed by the underlying source systems within the computing system 420.

Each runtime component generated in step 605 also may be customized, during or after the generation of the component, in accordance with the component's features (or properties) defined during the application design, and in accordance with the component's relationships with other components in the design. As discussed above, the runtime component designer 410 may collect component property data via the design-time interface, for example, data identifying the component's corresponding source system(s) within the computing system 420, data identifying any related events and event sources, data identifying the relationships of the component to other components, data identifying any business rules or logic applicable to the component, data identifying the alert conditions and/or patterns associated with the component, and/or data identifying response routing information for alerts and other objects (e.g., LTO objects). Thus, in step 605, each runtime component generated by the runtime component designer 410 may be customized (e.g., by API parameters, modifying the runtime object template, etc.) in accordance with the component's features/properties and the component's relationships with other components in the application.

Figure 7C:
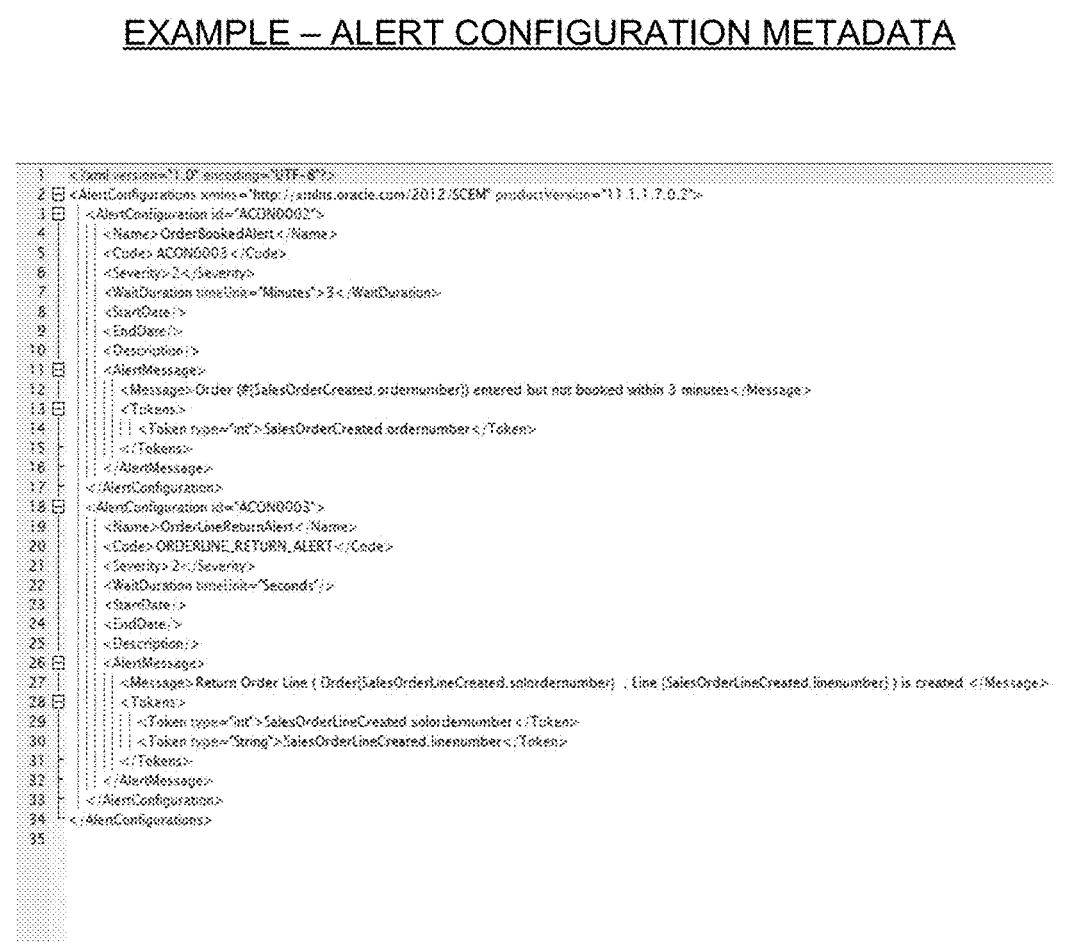

In some embodiments, the generation and customization of runtime components in step 605 may include creating or accessing metadata objects that define the runtime components. In some cases, metadata files (e.g., XML files or other format) may be used to generate the runtime components. For instance, an XML file containing runtime object information, features or properties, and relationships may be used create and customize an object from a runtime template, or may be provided as an input parameter to an API that generates or modifies runtime components. Referring briefly to FIGS. 7A-7C, three examples of illustrative XML metadata files are shown. These illustrative metadata files correspond to an example application related to supply chain event management (SCEM). In these example, a first metadata file (FIG. 7A) contains the application design based on the data received via the design-time interface, a second metadata file (FIG. 7B) contains the logical transaction data for the application, and a third metadata file (FIG. 7C) contains the alert configuration data for the application.

In step 606, the runtime components generated in step 605 may be deployed within the computing system 420. As discussed above, such components may include various types of simple and complex components to be deployed throughout the computing system 420, such as SOA artifacts, CEP applications, data objects and messaging services for BAM software, and other components deployed within various source systems (e.g., event systems, alert systems, and/or visualization systems) within the computing system 420. Thus, functionality of the runtime component designer 410 discussed herein may hide the complexity of the underlying technologies within the computing system 420 while providing an abstraction which decreases the technological requirements and entry barriers for building and deploying software applications.

Figure 8:
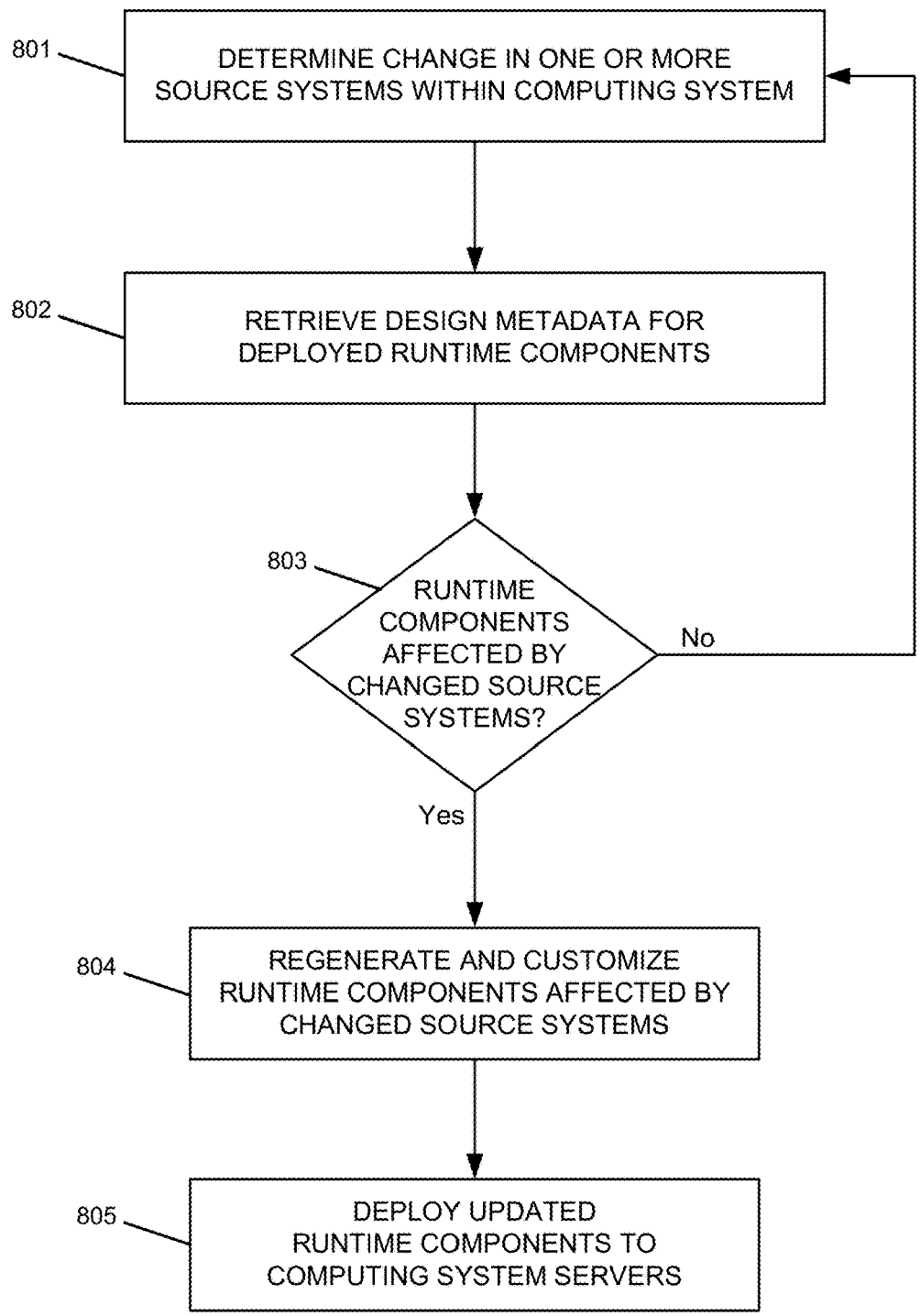
FIG. 8 is a flowchart illustrating a process for regenerating a set of runtime components in response to a change in one or more source systems within a hardware and software computing system, according to one or more embodiments of the present invention.

FIG. 8 is a flowchart illustrating the regeneration and customization of a set of runtime components deployed within a hardware/software computing system. The steps in this process, discussed below, may be performed by one or more components in the example computing environment 400, such as a runtime component designer 410, in conjunction with various system components 422-428, user devices 430, and/or external systems 440. However, it should be understood that the design, generation, and deployment of runtime components need not be limited to the specific system and hardware implementations described above in FIGS. 1-4, but may be performed within other hardware and system environments comprising other combinations of the hardware and software components described herein.

The example process illustrated in FIG. 8 may be initiated based on a change in one or more source systems within an computing system 420. Such changes may include software and/or hardware changes to the various components 422-428 of the computing system 420. As discussed above, computing systems may include various source systems such as databases 422, network devices and components 424, computer servers 426, and software components 428. Each of these individual source systems may be implemented in hardware, software, or a combination of hardware and software components. Moreover, certain systems may include various hardware and networking devices having different manufacturers, configured at different times and in different situations, and operating under different conditions in different geographic locations. Many systems also combine legacy hardware and software systems with newly implemented systems. Thus, many different activities or occurrences within the computing system 420, such as software and hardware upgrades, infrastructure changes, outages, and system maintenance, may cause in changes in the availability or functionality of the underlying source systems 422-428.

In step 801, the runtime component designer 410 may determine that a change has occurred in one or more of the source systems within the computing system 420. For example, the hardware and/or software of one of the underlying source systems 422-428 may have been replaced or upgraded. In other examples, a change to the underlying design or architecture of the system infrastructure may cause changes in the availability or functionality of various software, hardware, and/or network components within the system 420. The runtime component designer 410 may determine that a change has occurred in step 801 based on data received from the system components 422-428. In some embodiments, the runtime component designer 410 may poll various system components to detect outages, service restorations, upgrades, new systems online, and other changes in the system hardware and software components of the system 420.

In step 802, the runtime component designer 410 may retrieve the design metadata for one or more applications in response to determining in step 801 that one or more source systems 422-428 has changed. As discussed above in reference to FIG. 6, in some embodiments, metadata objects (e.g., XML metadata files) containing application design information may be created and stored during the process of generating and customizing a set of runtime components for an application. The metadata for an application may identify each of the underlying source systems deployed on and/or used by the application. Thus, in step 802, the runtime component designer 410 may retrieve the metadata objects corresponding to all applications currently deployed and executing within the system 420.

In step 803, the runtime component designer 410 may use the metadata retrieved in step 802 to identify one or more applications that may be affected by the changes to the source systems 422-428 determined in step 801. For example, if a set of software upgrades, hardware replacements, or the like, occurring within the computing system 420 may affect the availability and/or functionality of any databases 422, network devices 424, servers 426, or software objects 428, then the runtime component designer 410 may search the retrieved metadata to identify all applications deployed on or relying upon the affected components 422-428. If no applications will be affected by the changes to the underlying source systems (803:No), then the runtime component designer 410 need not regenerate and/or customize any of the runtime components currently deployed on the computing system 420.

If one or more applications may be affected by the changes to the underlying source systems (803:Yes), then in step 804 the runtime component designer 410 may regenerate and/or customize the affected components. In some cases, the runtime component designer 410 may be able to automatically determine the changes needed for the application. For instance, if an event source has been changed to support a different set of a events and/or return different types or formats of data when an event fires, then the runtime component designer 410 may automatically update the application design (e.g., by updating the metadata objects or files for the application design) in accordance with the new events or new event data. As another example, if an alert or visualization software system 428 within the computing system 420 is removed or replaced, then the runtime component designer 410 may automatically update the application design use new or alternative alert or visualization systems that are available in the updated system 420. Similarly, if any of the underlying source systems 422-428 undergoes a hardware or software change that affects its functionality or access interfaces (e.g., API calls, service interfaces, etc.), then the runtime component designer 410 may automatically update the application design and regenerate the runtime components in step 804.

In some embodiments, the runtime component designer 410 may be unable to, or may be configured not to, automatically update the application design in step 804. In some alternatives, the runtime component designer 410 may transmit a notification to a user of the affected application (e.g., the application designer or owner), and then initiate a design-time interface, similar to the interface 500 shown in FIG. 5B, to allow the notified user to redesign the application in accordance with the changes to the source systems of the computing system 420. For example, if one or more of the previous components (e.g., event sources, events, alert systems, visualization systems, response systems, etc.) have been change or are no longer available, then the interface 500 may highlight the affected components and require the user to update or remove the components. In these examples, after the user has redesigned and saved the updated application design, then the runtime component designer 410 may regenerate the runtime components in step 804, in a similar manner to the initial generation of the runtime components in step 605.

In step 805, the runtime components regenerated in step 804 may be deployed within the computing system 420. As discussed above, such components may include various types of simple and complex components to be deployed throughout the computing system 420, such as SOA artifacts, CEP applications, data objects and messaging services for BAM software, and other components deployed within various source systems (e.g., event systems, alert systems, and/or visualization systems) within the computing system 420. Thus, functionality of the runtime component designer 410 discussed herein may hide the complexity of the underlying technologies, as well as easily adapt to changes within the underlying technologies and infrastructure of the computing system 420.

Figure 9:
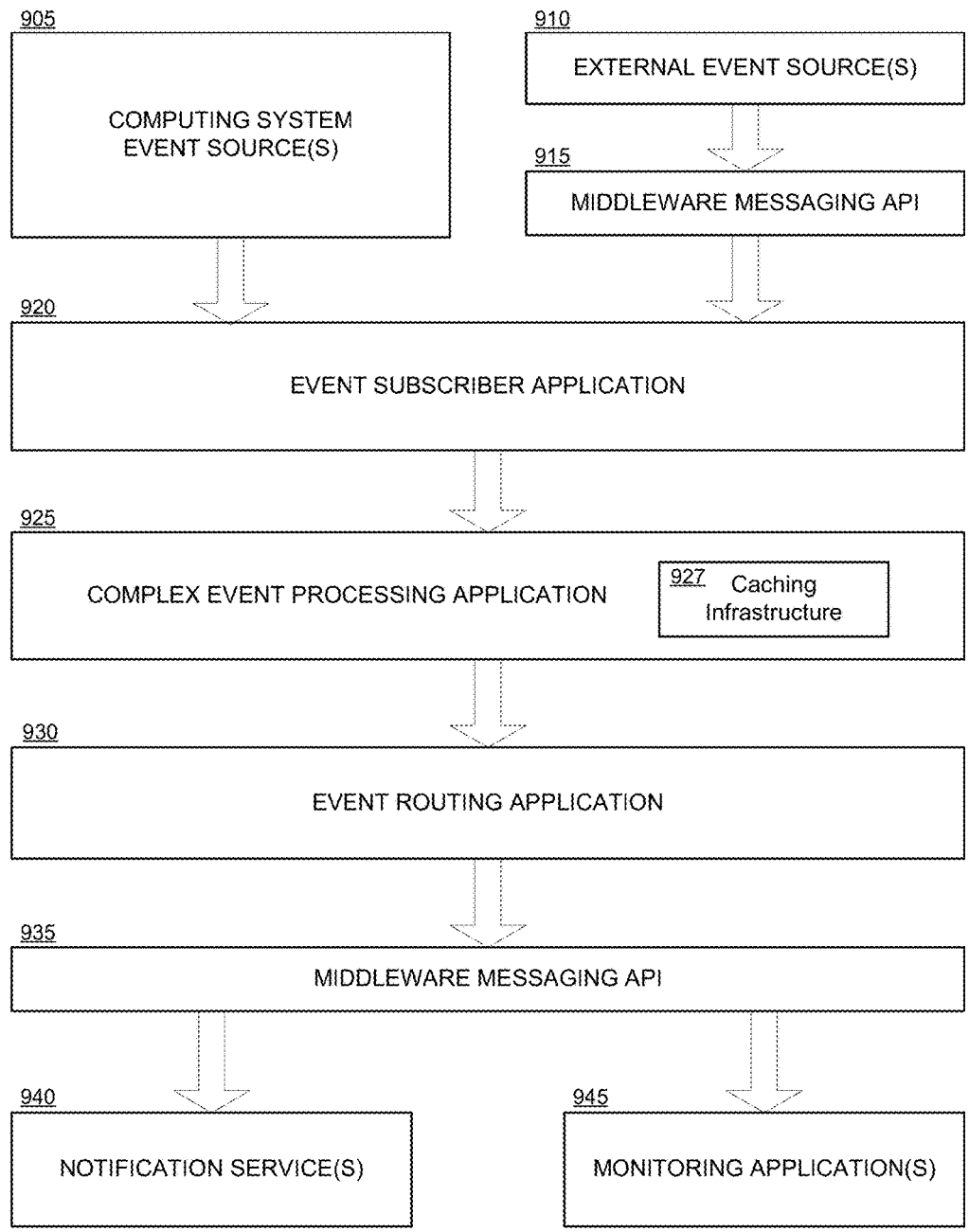
FIG. 9 is a block diagram illustrating an exemplary data flow for an application, according to one or more embodiments of the present invention.

FIG. 9 is a block diagram illustrating the data flow between generated runtime components for an exemplary application designed and deployed on an computing system 420. The application may be, for example, a supply chain event management (SCEM) application, an inventory management application, an enterprise resource planning (ERP) application, a document management application, an eCommerce application, a customer relationship management (CRM) application, and the like. This diagram illustrates one particular implementation, and event data flows from event sources through the generated runtime components (e.g., SCEM server components). In this example, the application include one or more event sources 905 (e.g., an Oracle E-Business Suite (EBS) application) that may publish events, for example using Advanced Queue (AQ). The application also may subscribe to one or more external event sources 910, which may publish events that can be pushed to the service-oriented architecture (SOA) components of the application via a messaging system 915 (e.g., the Java Message Service (JMS) API or other message oriented middleware API). An event subscriber application 920 may include the SOA artifacts that subscribe to the events from the event sources 905 and/or other external applications 910, for example, using AQ adapters or JMS adapters. The SOA artifacts in the event subscriber application 920 may be runtime components generated by the runtime component designer 410, and may be used to apply the user-provided transformations on the subscribed messages, and then enqueue the received messages to messaging queues for processing by the complex event processing (CEP) application 925.

The runtime components corresponding to the CEP application 925 may include one or more CEP processors designed to receive and process the events and alerts that were predesigned via the design-time interface. These CEP processors may consume the events from messaging queues (e.g., JMS queues) and cache them into an in-memory caching infrastructure 927, such as, for example, Oracle Coherence. The CEP application 925 may then create and publish Logical Transaction Objects (LTOs) based on the received events and alerts. The CEP application 925 may detect any predefined conditions for alerts or other responses, and then publish the corresponding alerts or responses.

The event routing application 930 includes runtime components corresponding to generated SOA artifacts that may route the LTO published by the CEP application 925 and any alerts, via a messaging system 935 (e.g., the JMS API or other message oriented middleware API), to one or more notification services 940 and/or one or more monitoring applications 945. Notification services 940 may use predefined rules to transmit alerts via email, SMS, or other techniques to predefined users and groups. The monitoring applications 945 may be, for example, a business activity monitoring (BAM) dashboard application capable of displaying alerts and/or data corresponding to the LTOs published by the CEP application 925. In some embodiments, the runtime component designer 410 may be configured generate resources within the notification services 940 and/ or monitoring applications 945, such as message system queues (e.g., JMS queues), enterprise messaging sources (EMSs) and data objects (DOs), to support end-to-end processing. During deployment, such resources may be created and wired together in accordance with the defined design for the application.

Figure 10:
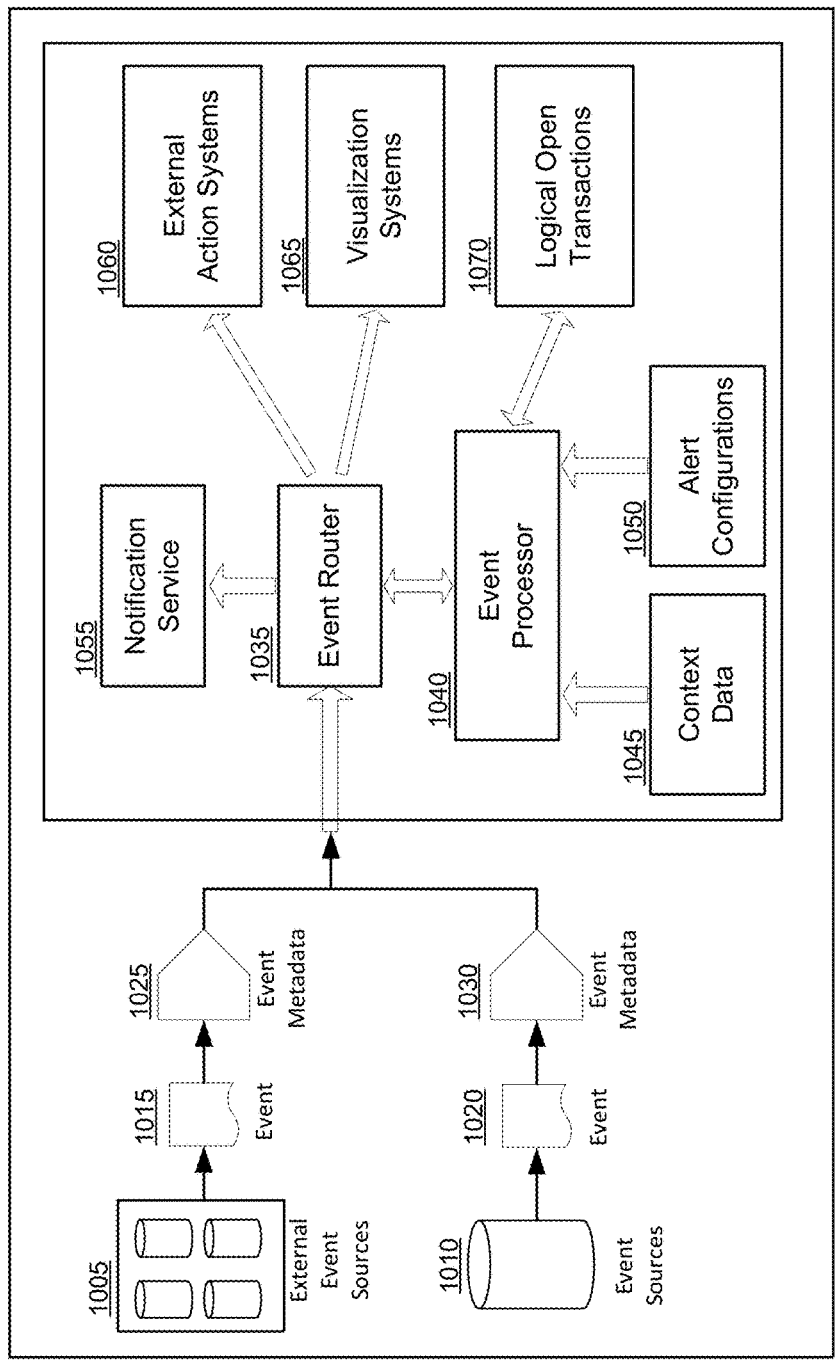
FIG. 10 is a block diagram illustrating an exemplary runtime architecture of an application, according to one or more embodiments of the present invention.

FIG. 10 is a block diagram illustrating a runtime architecture of an exemplary application designed and deployed on an computing system 420. As in the above examples, the application shown in FIG. 10 may be any type of application, such as a supply chain event management (SCEM) application, an inventory management application, an enterprise resource planning (ERP) application, a document management application, an eCommerce application, a customer relationship management (CRM) application, and the like. The runtime architecture in this example includes a number of external event sources 1005 (e.g., business-to-business (B2B) messaging sources), as well as event sources 1010 such as events generated from various applications. The events 1015 and 1020, generated respectively by event sources 1005 and 1010, which are relevant to the design of this application may be defined during the application design process, discussed above. During execution of the runtime components, the event metadata 1025 and 1030 may be processed upon occurrence of the events in a middle tier of the application, for example, by an event processor 1040 (e.g., Oracle Event Processor (OEP)). An event router component 1035 may route the event metadata 1025 and 1030 to the event processor 1040, and may also route application-generated events and responses such as LTOs, alerts, and the like, from the event processor 1040 to one or more visualization systems 1065 (e.g., a BAM dashboard application) and/or one or more notification services 1055 (e.g., email, SMS, etc.). The event processor 1040 may apply the predefined logic rules of the application design to the incoming stream of events from event sources 1005 and 1010, and evaluate the incoming event streams (e.g., using pattern matching, aggregation, etc.) and determine the appropriate response (e.g., LTOs, alerts, etc.). Context data 1045 may include a repository of event entity relations, and event attribute mapping that may be built by the runtime component designer 410 during the application design process, and used by the event processor runtime application 1040 to generate LTOs. The alert configurations 1050 may contain metadata definitions for various alerts that may be initiated and transmitted by the application, such as message content, duration, and parameters. Notification services may use the SOA workflow and user messaging system to transmit notifications via email, SMS, and other notification media. External action systems 1060 may be implemented as part of the application, as shown in this example, or may be implemented separately from the application. In either case, the external action systems 1060 may allow customers to extend the application functionality (e.g., SCEM functionality) to create tickets in one or more internal ticket tracking systems and/or to resolve issues raised by alerts. The Logical Open Transactions object 1070, in this example, may represent the in-memory cache of open transactions used by the LTO and alert processors to update and raise alerts.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for generating runtime components within a hardware and software computer system, the method comprising:
   generating a design-time interface comprising a plurality of graphical components, each said graphical component corresponding to one or more source systems within a hardware and software computer system;
   receiving an application design via the design-time interface, wherein receiving the application design comprises:
   (a) receiving a selection of a plurality of graphical components via the design-time interface, the plurality of graphical components corresponding to at least two different source systems within the hardware and software computer system,
   (b) receiving, for each particular graphical component within the selected plurality of graphical components, a placement location within the design-time interface for the particular graphical component;
   (c) determining one or more functional relationships between the plurality of graphical components in the received application design, each said functional relationship defining an interaction between a particular pair of the plurality of graphical components, wherein the determination of the one or more functional relationships is based on (i) the at least two different source systems corresponding to the plurality of selected graphical components, (ii) compatibility data retrieved based on the different source systems, and (iii) relative placement locations for each of the plurality of graphical components within the design-time interface;
   (d) determining, for a first graphical component within the selected plurality of graphical components, one or more levels of current hardware resource availability, software resource availability, or network resource availability for the one or more source systems corresponding to the selected first graphical component,
   (e) determining limits for one or more user-configurable properties of the one or more source systems corresponding to the selected first graphical component, wherein the limits for the user-configurable properties are based on the determined one or more levels of current hardware resource availability, software resource availability, or network resource availability for the one or more source systems corresponding to the selected first graphical component,
   (f) receiving, via the design-time interface, user configuration selections for the user-configurable properties, wherein receiving the user configuration selections comprises enforcing the determined limits for the user-configurable properties within the design-time interface; and
   generating a plurality of runtime components corresponding to the application design, wherein each of the plurality of runtime components is configured to access at least one source system within the hardware and software computer system, and wherein generating the plurality of runtime components comprises:
   (a) customizing each particular runtime component within the plurality of generated runtime components, based on the functional relationships determined between the graphical components in the received application design; and
   (b) configuring the first graphical component of the plurality of runtime components in accordance with the received user configuration selections for the user-configurable properties.

2. The method of claim 1, wherein the plurality of graphical components in the received application design comprises one or more event sources.

3. The method of claim 2, further comprising:
   receiving data from the one or more event sources indicating an occurrence of one or more events; and
   executing the plurality of runtime components based on the occurrence of the one or more events.

4. The method of claim 1,
   wherein the limits for the one or more user-configurable properties are determined based on one or more of: (i) a current number of users or connections, (ii) current response time metrics, (iii) current memory availability, (iv) current processing availability, or (v) current bandwidth availability, in the source systems corresponding to the first graphical component.

5. A system comprising:
   a processing unit comprising one or more processors; and
   memory coupled with and readable by the processing unit and storing therein a set of instructions which, when executed by the processing unit, causes the processing unit to generate runtime components within a hardware and software computer system by:
   generating a design-time interface comprising a plurality of graphical components, each said graphical component corresponding to one or more source systems within a hardware and software computer system;

receiving an application design via the design-time interface, wherein receiving the application design comprises:
(a) receiving a selection of a plurality of graphical components via the design-time interface, the plurality of graphical components corresponding to at least two different source systems within the hardware and software computer system,
(b) receiving, for each particular graphical component within the selected plurality of graphical components, a placement location within the design-time interface for the particular graphical component;
(c) determining one or more functional relationships between the plurality of graphical components in the received application design, each said functional relationship defining an interaction between a particular pair of the plurality of graphical components, wherein the determination of the one or more functional relationships is based on (i) the at least two different source systems corresponding to the plurality of selected graphical components, (ii) compatibility data retrieved based on the different source systems, and (iii) relative placement locations for each of the plurality of graphical components within the design-time interface;
(d) determining, for a first graphical component within the selected plurality of graphical components, one or more levels of current hardware resource availability, software resource availability, or network resource availability for the one or more source systems corresponding to the selected first graphical component,
(e) determining limits for one or more user-configurable properties of the one or more source systems corresponding to the selected first graphical component, wherein the limits for the user-configurable properties are based on the determined one or more levels of current hardware resource availability, software resource availability, or network resource availability for the one or more source systems corresponding to the selected first graphical component,
(f) receiving, via the design-time interface, user configuration selections for the user-configurable properties, wherein receiving the user configuration selections comprises enforcing the determined limits for the user-configurable properties within the design-time interface; and generating a plurality of runtime components corresponding to the application design, wherein each of the plurality of runtime components is configured to access at least one source system within the hardware and software computer system, and wherein generating the plurality of runtime components comprises:
(a) customizing each particular runtime component within the plurality of generated runtime components, based on the functional relationships determined between the graphical components in the received application design; and
(b) configuring the first graphical component of the plurality of runtime components in accordance with the received user configuration selections for the user-configurable properties.

6. The system of claim 5, wherein the plurality of graphical components in the received application design comprises one or more event sources.

7. The system of claim 6, the memory storing therein further instructions which, when executed by the processing unit, causes the processing unit to:
receive data from the one or more event sources indicating an occurrence of one or more events; and
execute the plurality of runtime components based on the occurrence of the one or more events.

8. The system of claim 5,
wherein the limits for the one or more user-configurable properties are determined based on one or more of: (i) a current number of users or connections, (ii) current response time metrics, (iii) current memory availability, (iv) current processing availability, or (v) current bandwidth availability, in the source systems corresponding to the first graphical component.

9. A non-transitory computer-readable memory comprising a set of instructions stored therein which, when executed by a processor, causes the processor to generate runtime components within a hardware and software computer system by:
generating a design-time interface comprising a plurality of graphical components, each said graphical component corresponding to one or more source systems within a hardware and software computer system;
receiving an application design via the design-time interface, wherein receiving the application design comprises:
(a) receiving a selection of a plurality of graphical components via the design-time interface, the plurality of graphical components corresponding to at least two different source systems within the hardware and software computer system,
(b) receiving, for each particular graphical component within the selected plurality of graphical components, a placement location within the design-time interface for the particular graphical component;
(c) determining one or more functional relationships between the plurality of graphical components in the received application design, each said functional relationship defining an interaction between a particular pair of the plurality of graphical components, wherein the determination of the one or more functional relationships is based on (i) the at least two different source systems corresponding to the plurality of selected graphical components, (ii) compatibility data retrieved based on the different source systems, and (iii) relative placement locations for each of the plurality of graphical components within the design-time interface;
(d) determining, for a first graphical component within the selected plurality of graphical components, one or more levels of current hardware resource availability, software resource availability, or network resource availability for the one or more source systems corresponding to the selected first graphical component,
(e) determining limits for one or more user-configurable properties of the one or more source systems corresponding to the selected first graphical component, wherein the limits for the user-configurable properties are based on the determined one or more levels of current hardware resource availability, software resource availability, or network resource availability for the one or more source systems corresponding to the selected first graphical component, (f) receiving, via the design-time interface, user configuration selections for the user-configurable properties, wherein receiving the user configuration selections comprises enforcing the determined limits for the user-configurable properties within the design-time interface; and generating a plurality of runtime components corresponding to the application design, wherein each of the plurality of runtime components is configured to access at least one source system within the hardware and software computer system, and wherein generating the plurality of runtime components comprises:

(a) customizing each particular runtime component within the plurality of generated runtime components, based on the functional relationships determined between the graphical components in the received application design; and (b) configuring the first graphical component of the plurality of runtime components in accordance with the received user configuration selections for the user-configurable properties.

10. The computer-readable memory of claim 9, wherein the plurality of graphical components in the received application design comprises one or more event sources.

11. The computer-readable memory of claim 10, the memory storing therein further instructions which, when executed by the processor, causes the processor to:

receive data from the one or more event sources indicating an occurrence of one or more events; and execute the plurality of runtime components based on the occurrence of the one or more events.

12. The computer-readable memory of claim 9, wherein the limits for the one or more user-configurable properties are determined based on one or more of: (i) a current number of users or connections, (ii) current response time metrics, (iii) current memory availability, (iv) current processing availability, or (v) current bandwidth availability, in the source systems corresponding to the first graphical component.

* * * * *